Jan. 29, 1946.　　　M. G. TOWNSLEY　　　2,393,842
CLAMPING DEVICE AND CLAMP STRIP THEREFOR
Filed Sept. 15, 1944
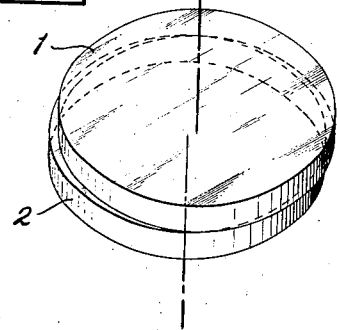
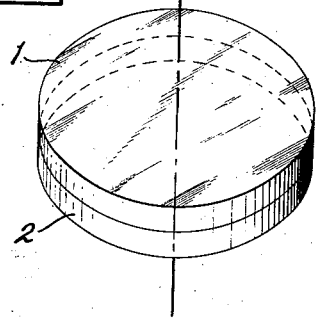
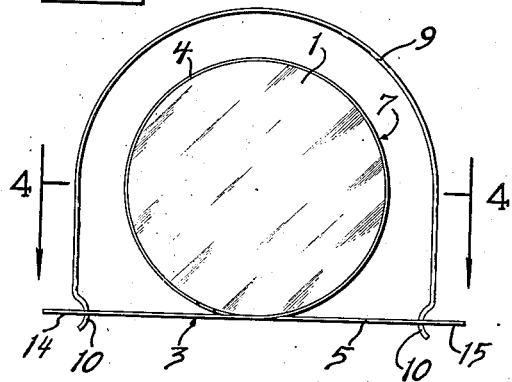
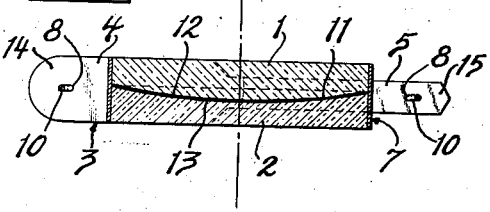
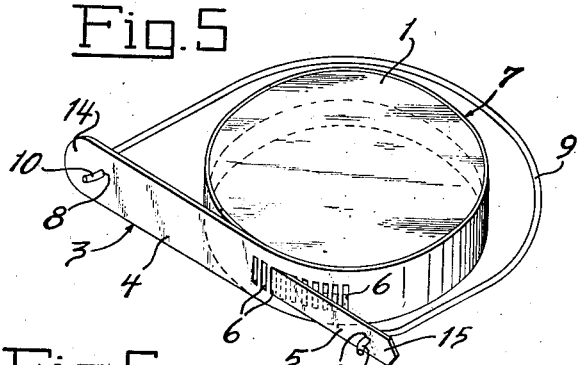
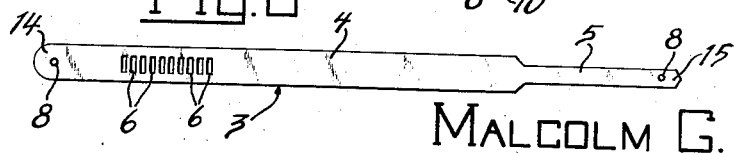
INVENTOR
MALCOLM G. TOWNSLEY
BY Robert F. Miehle, Jr.
ATT'Y.

Patented Jan. 29, 1946

2,393,842

UNITED STATES PATENT OFFICE 2,393,842

CLAMPING DEVICE AND CLAMP STRIP THEREFOR

Malcolm G. Townsley, Park Ridge, Ill., assignor to The Bell & Howell Company, Chicago, Ill., a corporation of Illinois Application September 15, 1944, Serial No. 554,205

4 Claims. (Cl. 24—19)

My invention relates particularly to a clamping device which is adapted for clamping the lens components of cemented optical lens elements in accurately concentric relation during the process of cementing the components together to form the lens elements.

Objects of the invention reside in the provision of a novel, simple and effective clamping device and clamp strip therefor which is particularly adapted for the above purpose, which is convenient in use, which permits of the clamp strip thereof being made of cheap or discardable material such as paper so that each clamp strip may be used but once and then discarded, which is particularly adapted for the quantity production of cemented optical lens elements, and which is adjustable say for different lens diameters.

The invention will be better understood by reference to the accompanying drawing in which—

Figure 1 is a perspective view of the lens components of a cemented optical lens element showing the components in eccentric relation, which is the condition which the use of my clamping device avoids;

Figure 2 is a perspective view of the lens components of a cemented optical lens element showing the components in accurately concentric relation which is the condition which the use of my clamping device conveniently attains;

Figure 3 is an elevational view of the clamping device of my invention showing it clamping the lens components of a cemented lens in concentric relation;

Figure 4 is a sectional view substantially on the line 4—4 of Figure 3;

Figure 5 is a perspective view of the clamping device of my invention showing it clamping the components of a cemented lens in concentric relation; and Figure 6 is a face view of the clamp strip of my invention.

Referring to the drawing, Figure 1 shows two lens components 1 and 2 assembled in eccentric relation, such eccentricity being highly undesirable as it interferes with the proper functioning of the lens element formed by the cemented components, and Figure 2 shows these components assembled in concentric relation, such concentric relation being necessary for the proper functioning of the lens element formed by the cemented components. The lens components are edged to the same diameter in exact concentricity with the optical axes thereof previous to their being cemented together to form the lens element, so that, if the components are cemented together with their peripheries in exact coincidence, their optical axes will be in exact coincidence with resulting proper functioning of the lens element. It is for the purpose of maintaining the lens components in exact axial coincidence while they are being cemented together to form the lens element that my clamping device and the clamp strip thereof are particularly adapted.

Referring particularly to Figure 6, the clamp strip of my invention, generally designated at 3, is formed of flexible sheet material and is preferably of cheap or discardable material such as paper, so that each strip may be used but once and then discarded.

The clamp strip 3 is provided with a relatively long and wide portion 4 and a relatively short and narrow portion 5 at one end of the strip, which narrow portion is lineally alined with the wide portion intermediate the lineal edges of the wide portion. The wide portion 4 is provided at a region thereof distantly spaced from the narrow portion 5 and adjacently spaced from the other end of the strip with a plurality of openings 6 therethrough adjacently spaced lineally of the strip and of extents transversely of the strip corresponding with the width of the narrow portion 5 and alined therewith lineally of the strip and through any one of which the narrow portion is passed to form a contractible clamp loop 7 as best shown in Figure 5. By selecting the opening 6 through which the narrow portion 5 is passed, the size of the clamp loop may be adjusted with the wide portion 4 desirably forming substantially the entire clamp loop in all adjustments of the clamp loop size.

The end portions 14 and 15 of the clamp strip 3 are provided with tensioning device apertures 8 alined lineally of the strip intermediate the lineal edges thereof, and a tensioning device, shown in the form of a C-shaped tensioning spring 9, extends about the clamping loop 7 for compactness and has its ends 10 respectively releasably engaged with the tensioning device apertures 8 and is thereby oppositely operative on the end portions of the strip to contract the clamp loop 7, the spring ends 10 being oppositely curved in the plane of the tensioning spring as shown to prevent accidental disengagement of the spring ends from the apertures 8.

In using my clamping device in the process of cementing the lens components of a lens element together to form the lens element, the components 1 and 2 are superimposed with cement 11 between the corresponding opposing faces 12 and 13 thereof as shown in Figure 4, and the components so superimposed are clamped in concentric relation by tensioning the clamp loop 7 of the clamp strip 3 about the peripheries of the components by means of the tensioning spring 9 as shown in Figures 3, 4 and 5. After the cement has set or hardened, the tensioning spring may be disengaged from the clamp strip for re-use with another clamp strip, leaving the clamp strip engaged about the cemented lens element. Inasmuch as the cement 11 seeps out beyond the peripheries of the components 1 and 2 during the cementing operation and adheres to the clamp strip, the cheap or discardable nature of the clamp strip is obviously advantageous in that it may be conveniently removed from the cemented lens element with no thought of preserving it for re-use.

While I have thus described my invention, I do not wish to be limited to the precise details described, as changes may be readily made without departing from the spirit of my invention, but having thus described my invention, I claim as new and desire to secure by Letters Patent the following:

1. In a clamping device, the combination of a clamp strip of flexible sheet material provided with a relatively wide portion and a relatively narrow portion at one end thereof and linearly alined with said wide portion intermediate the lineal edges of said wide portion and said wide portion being provided with at least one opening therethrough spaced from said narrow portion and from the other end of the strip and of an extent transversely of the strip corresponding with the width of said narrow portion and alined therewith lineally of the strip and through which said narrow portion is passed to form a contractible clamp loop, and tensioning means engaged with and oppositely operative on the end portions of said strip to contract said loop.

2. In a clamping device, the combination of a clamp strip of flexible sheet material provided with a relatively wide portion and a relatively narrow portion at one end thereof and lineally alined with said wide portion intermediate the lineal edges of said wide portion and said wide portion being provided with at least one opening therethrough spaced from said narrow portion and from the other end of the strip and of an extent transversely of the strip corresponding with the width of said narrow portion and alined therewith lineally of the strip and through which said narrow portion is passed to form a contractible clamp loop, and a C-shaped tensioning spring extending about said loop and having its ends respectively engaged with and oppositely operative on the end portions of said strip to contract said loop.

3. In a clamping device, the combination of a clamp strip of flexible sheet material provided with a relatively wide portion and a relatively narrow portion at one end thereof and lineally alined with said wide portion intermediate the lineal edges of said wide portion, said wide portion being provided at a region thereof distantly spaced from said narrow portion and adjacently spaced from the other end of the strip with a plurality of openings therethrough adjacently spaced lineally of the strip and of extents transversely of the strip corresponding with the width of said narrow portion and alined therewith lineally of the strip and through any one of which said narrow portion is passed to form a contractible clamp loop, the end portions of the strip being provided with tensioning device apertures alined lineally of the strip intermediate the lineal edges thereof, and tensioning means releasably engaged with said tensioning device apertures and thereby oppositely operative on the end portions of said strip to contract said loop.

4. In a clamping device, the combination of a clamp strip of flexible sheet material provided with a relatively wide portion and a relatively narrow portion at one end thereof and lineally alined with said wide portion intermediate the lineal edges of said wide portion, said wide portion being provided at a region thereof distantly spaced from said narrow portion and adjacently spaced from the other end of the strip with a plurality of openings therethrough adjacently spaced lineally of the strip and of extents transversely of the strip corresponding with the width of said narrow portion and alined therewith lineally of the strip and through any one of which said narrow portion is passed to form a contractible clamp loop, the end portions of the strip being provided with tensioning device apertures alined lineally of the strip intermediate the lineal edges thereof, and a C-shaped tensioning spring extending about said loop and having its ends respectively releasably engaged with said tensioning device apertures and thereby oppositely operative on the end portions of said strip to contract said loop.

MALCOLM G. TOWNSLEY.